United States Patent [19]

Ottesen et al.

[11] Patent Number: 4,894,599
[45] Date of Patent: Jan. 16, 1990

[54] DEADBEAT CONTROL OF DISK DRIVE ACTUATOR

[75] Inventors: Hjalmar H. Ottesen, Rochester, Minn.; Yuzo Nakagawa, Hiratsuka; Shyunji Ono, Fujisawa, both of Japan

[73] Assignee: International Business Machines Corporation, Armonk, N.Y.

[21] Appl. No.: 175,699

[22] Filed: Mar. 31, 1988

[51] Int. Cl.⁴ .......................................... G05B 21/02
[52] U.S. Cl. .................................. 318/636; 318/561; 318/600; 362/78.12; 362/77.05
[58] Field of Search ..................... 318/636, 561, 600; 360/78.12, 77.05

[56] References Cited

U.S. PATENT DOCUMENTS 4,232,364 11/1980 Bibbero .......................... 318/561 X
4,697,127 9/1987 Stich et al. .......................... 318/561
4,816,941 3/1989 Edel et al. .......................... 318/561 X Primary Examiner—William M. Shoop, Jr.
Assistant Examiner—Saul M. Bergmann
Attorney, Agent, or Firm—Robert W. Lahtinen

[57] ABSTRACT

In a servo controlled device such as a disk drive actuator or a robot that is driven by a DC motor and must seek from one position to another position and settle at the target position in a minimum time, a deadbeat control response can effect settling in a minimum number of servo sample times with no steady state error and no ripple between sampling instants. The device design, initial conditions entering the deadbeat controlled mode and the frequency of servo samples can be used to enable deadbeat control by limiting the control current to a value that will not saturate the motor coil or exceed the linear operating range of the controlled device.

8 Claims, 2 Drawing Sheets

DEADBEAT CONTROL OF DISK DRIVE ACTUATOR

FIELD OF THE INVENTION

The present invention pertains to the control of a DC motor driven moving system such as a disk drive actuator and more particularly to control of the settle mode in a moving system such as the track seek operation of a voice coil motor driven actuator in a disk drive data storage device and the use of the technique to implement short, fast seek operations such as a single track seek.

BACKGROUND OF THE INVENTION

In moving from track to track, a disk drive actuator uses a seek technique that involves accelerating the actuator assembly and decelerating the actuator assembly to a stop at the target track. Various seek modes are satisfactorily used, but the most difficult problem has been bringing the head to a smooth stop over the desired track in the shortest possible time. The settle mode, which is the transition between the seek operation and the track follow mode, during which the head motion is stabilized to permit the start of read or write operations has been the most difficult portion of the high speed access disk drive design.

In addition to seek modes that involve multiple track seeks, involving seek and settle modes prior to track follow operation, the single track seek offers a unique opportunity for performance enhancement. The most common seek is to the same track or cylinder. The single track seek is the most frequently occurring movement of the actuator between tracks in a properly organized data storage system. Thus the seeks to the same track or an adjoining track are combined, most seeks by the device actuator are included. Accordingly, device performance can be enhanced if a single track seek can be accomplished by a simplified, shortened procedure. The optimum simplicity and performance can normally be achieved if the single track seek can utilize an error signal that causes a single track displacement without entering the seek mode.

SUMMARY OF THE INVENTION

In the technique of the present invention, deadbeat control is used during the settle mode to bring the error response to zero in the shortest possible time. The deadbeat response concept is unique to discrete-time systems, there being no deadbeat response in continuous-time systems. Theoretically, the deadbeat control yields the fastest possible response to a step function input. It guarantees that a closed loop system must possess a finite settling time for the step function input. Finally, the closed loop system will respond to a step function input with a zero steady state error. An Nth order deadbeat digital control system will have all N closed-loop poles at the origin in the Z plane. This can be done by using well known pole placement design techniques. The deadbeat control requires that the system does not saturate or become nonlinear.

Although the concept of deadbeat control for continuous systems has been known, it has infinite bandwidth and requires an infinite amount of power to work in a general application. This being physically impossible, the servo control communities have looked at deadbeat control as being an academic curiosity rather than a useful servo technology. However, deadbeat control in digital servo applications does not require infinite power and can be a useful tool in designing minimum response time systems. The deadbeat control response is described in "Discrete-Time Control Systems" by Katsuhiko Ogata, Prentice-Hall, Inc., 1987, beginning at page 668.

It has been found that the deadbeat control technique can be used during the settle portion of the track access. In this mode the head settle limit is typically set to one track pitch or less. Thus there is no need for infinite power and the deadbeat control sequence guarantees that an Nth order closed-loop system will reach and have settled on the track in N or less sampling periods. Typically, settling can be effected in current sector servo disk drive designs in four or less sector times. The number of steps and the time between data samples must be selected to prevent the high current inherently associated with the control technique from exceeding a value that would saturate the DC motor coil or cause operation to occur in a nonlinear region. In a disk drive data storage device, the fastest possible access performance is attained by using deadbeat control in both the estimator and controller. In practice deadbeat control is difficult to achieve due to variations in parameters of the actuator or other controlled device. However, it is possible to more closely approach the theoretical limit of control by combining the deadbeat control with adaptive control of the device.

DETAILED DESCRIPTION

The most difficult portion of any high speed access data storage disk drive design is the track settle mode, the transition between the track-seek mode and track-follow mode. The three disk drive track access servo modes (seek, settle and follow) are hypothetically shown in FIG. 1. The head trajectory is shown in terms of the track misregistration (TMR) versus time. The control algorithm switches from the seek to the settle mode when the TMR is less than the head settle limit, Es. The objective in the settle mode is to dissipate the kinetic energy stored in the disk drive actuator in the minimum time, allowing the head to settle on the track in a smooth way within the off-track limits, +/−Ef. Once within the off-track limits, the track follow mode takes control and keeps the TMR variation to values not exceeding Ef. The track access time from one track to another is defined as the sum of the track seek time and track settle time plus some fixed time within the track follow mode to assure that the TMR is within the off-track limits +/−Es. At the end of the track access time, the logic signal FILE READY comes on allowing read and write operations to commence. Sometimes, the off-track limits are set larger for a read operation than for a write operation. This will make the access time somewhat longer for a write operation than a read operation. If the off-track limits are exceeded in the track follow mode for a certain period of time, an error will be registered.

In analog control systems, proportional-integral-derivative (PID) controllers, among others, have been used to obtain reasonably satisfactory performance. Tuning of a PID controller has been limited to proportional gain, integral gain and derivative gain. In digital control systems, the compensator algorithms are not limited to PID, but an infinity of control actions are available. One such control action is deadbeat control. Deadbeat control is characterized by its ability to settle the output in the minimum possible time, such that the output reaches the final value in minimum time and stays there, with no steady state error and no ripples between sampling instants.

The transfer function of a system with deadbeat response is characterized by the poles which are all located at the origin, $Z=0$. The design of deadbeat control can easily be done by pole-placement techniques, which are explained in most textbooks on digital servo control. Deadbeat can be classified into three categories wherein the order of the controller and the estimator, respectively are n and m. With the controller polynomial Dc(z) and the estimator polynomial De(z) the three cases are:

1. Deadbeat controller $$Dc(z)=z^n$$

$$De(z)=z^m+b1z^{m-1}+\ldots bm$$

2. Deadbeat estimator $$Dc(z)=z^n+a1z^{n-1}+\ldots an$$

$$De(z)=z^m$$

3. Deadbeat compensator $$Dc(z)=z^n$$

$$De(z)=z^m$$

The closed-loop transfer function Gcl is:

$$Gcl(z) = \frac{Y(z)}{R(z)} = \frac{A(z)}{Dc(z) \times De(z)} \qquad 4.$$

Figure 1:
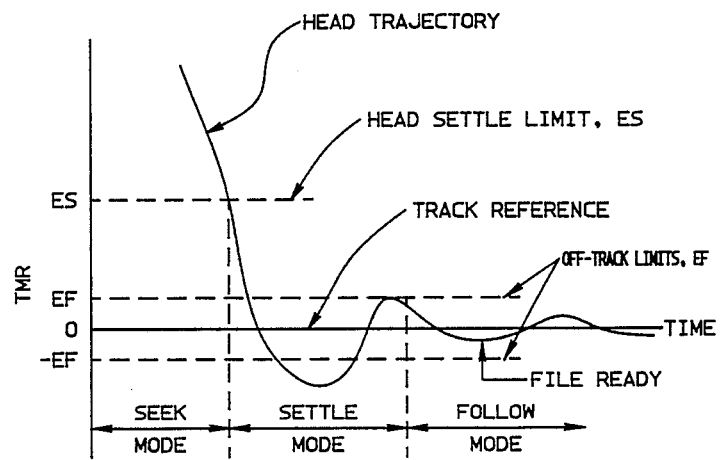
FIG. 1 is a schematic showing of track misregistration vs. time illustrating the three modes of actuator control.

As shown schematically in FIG. 1, the actuator moves the transducer head using three modes of operation. The seek mode, shown near the termination of a seek cycle, is normally controlled by the microprocessor to follow a velocity profile through a sequence of acceleration; constant velocity, during long seeks when a terminal velocity is achieved and deceleration approaching the target track. At some design threshold Es the control system enters the settle mode which seeks to attain alignment with the target track in the shortest possible time to optimize the overall performance of the drive. The final mode is track follow during which the transducer is maintained between the off-track limits $+/-Ef$ to enable read-write operations to be performed.

Figure 2:
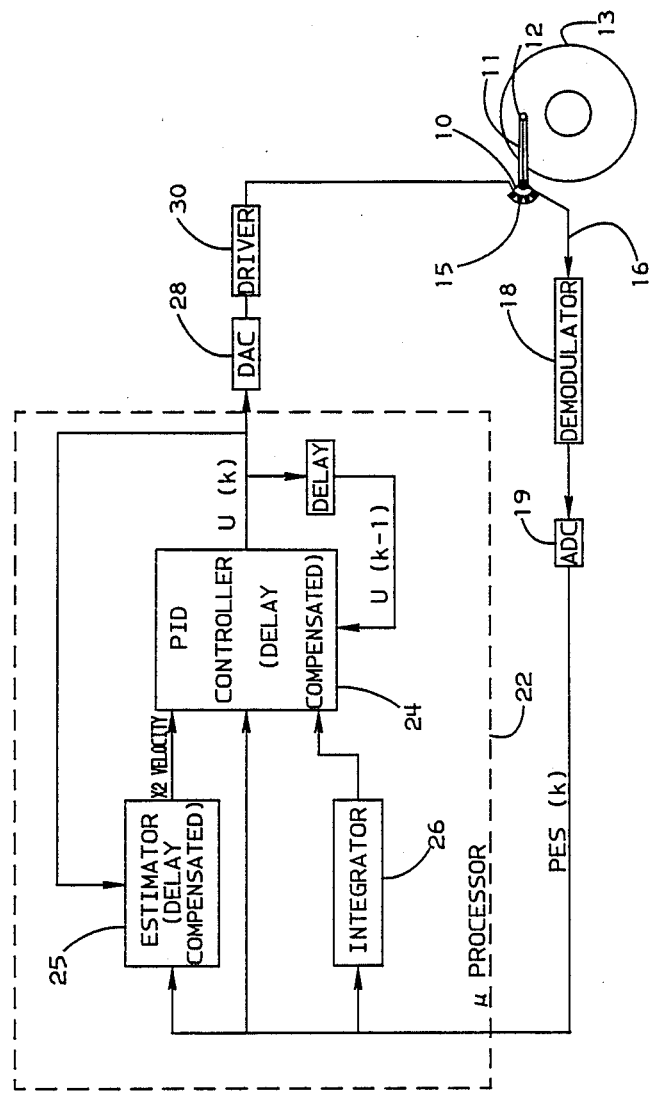
FIG. 2 is a block diagram of a disk drive including the microprocessor and actuator for control of the positioning of the transducer with respect to the disk surface.

The present invention is directed to optimization of the settle mode utilizing deadbeat control. The diagram of FIG. 2 illustrates the actuator control structure. The plant or actuator 10 includes an arm 11 which carries a transducer 12 for reading data from and writing data to rotating disk 13 and is driven or pivoted by a voice coil 15 to seek a target track and track follow during data storage and retrieval. A servo signal from sector servo or embedded servo information is transmitted periodically at sample times on line 16 to demodulator 18. Demodulator 18 converts the signal to a continuous analog position error signal (PES) that is converted by ADC to a digitized PES that is maintained until succeeded by the next subsequent servo signal.

The microprocessor 22 includes a delay compensated controller 24, a delay compensated reduced order estimator 25 and an integrator 26 (which is used during track follow mode and not normally during settle mode).

The delay compensated controller 24 has the position input PES(k); the velocity input X2 and the delay represented by the prior value input u(k−1). This affords typically a third order device having the characteristic polynomial, wherein p equals 3:

$$Dc(z)=z^p+b1z^{p-1}+\ldots bp$$

The delay compensated reduced order estimator 25 compensates with respect to velocity, bias and previous control value. This is typically also a third order device having the characteristic polynomial, wherein m equals 3:

$$De(z)=z^m+a1z^{m-1}+\ldots am$$

For deadbeat control:

$$Dc(z) \times De(z)=z^n$$

$$Dc(z)=z^p, De(z)=z^m$$

$$De(z) \times De(z)=z^{m+p}=z^n$$

$$n=m+p$$

The deadbeat compensator, determined by the coefficients in the estimator and the controller, will settle the output with no steady state error and no ripples between servo samples in no more than a number of sample periods equal to the sum of the orders of the estimator and controller polynomials (m+p) or six samples. Aside from selecting the initial conditions, the only control is the time between samples. The sample periods must be selected to prevent delivery of a current to the voice coil 15 that saturates the voice coil or exceeds the linear range of the actuator control. The ideal operating mode is to use six or fewer consecutive servo samples if such operation is within the prescribed parameters.

The controller output u(k) is converted by digital to analog converter 28 to an analog value which controls the current level supplied to the actuator voice coil 15 by driver circuits 30 during the period between servo samples.

If the integrator is used, the system would be raised to a seventh order and the deadbeat control would settle the system in no more than seven sample periods. The integrator would permit a further influence on the system which could be used with the initial conditions to alter the current values used during the settle sequence. The deadbeat control results in high current values that must be contained to accommodate the power supply capabilities and the linear operating range of the actuator electrical and magnetic systems.

In a specific application, the deadbeat control does not completely settle the system. To do so would require that all the parameters that influence the system have deadbeat compensation. If this were done, so many minor factors (also known as state variables) affecting the system would be included that the principal benefit of the technique would not be realized. Since each compensated factor would increase the number of samples required for the deadbeat response, the time advantage over other control techniques would be lost. In the example described, a reduced order delay compensated estimator and a delay compensated controller are each third order devices with compensation of three principal factors or state variables. The three dynamically dominant factors (also known as state variables) which are controlled with respect to the estimator are velocity, bias and previous control value. The controller also compensates with respect to three dominant factors which are position, velocity and previous control value. The controller also compensates with respect to three dominant factors which are position, velocity and previous control value. Thus deadbeat control can be effected in no more than six sample times. Since the actuator servo control requires that the system be settled such that the non-deadbeat track follow mode can be entered by bringing the transducer to a position error of $+/-\text{Ef}$ with respect to the target track centerline as quickly as possible, it would not be prudent to extend the number of sample times to accommodate factors with only a minor influence on the system. A further trade off that could be considered is the use of deadbeat control with even fewer control factors. If the estimator used deadbeat control only with respect to velocity and the controller has only a second order control function, the overall system would be only third order and the deadbeat response could be achieved in three sample times. Although the response would be less accurate, it would occur in half the time or if alternate sampling instants were used, the sample period could be doubled and the current values reduced to a quarter of the current levels required at the faster sampling rate.

The deadbeat control provides electrical power to counter the kinetic energy of the system under control. In the simplest mode, where a two order system is driven from one stationary position to another stationary position, a single large accelerating current is applied at the first sample time followed by a second large decelerating current applied at the second sample time which is equal to and opposite in polarity that brings the device to a steady state, ripple free stop at the target location. The effect is that the first pulse accelerates the device toward the target location and the second pulse dissipates the kinetic energy to stop the movement of the device. Higher order systems are more complex and provide what appear to be erratic current values to effect the deadbeat mode of control. The highest current values can occur variously during the deadbeat sequence in response to the conditions associated with the controlled device. If the current values are too great, the period between samples may be lengthened. In a sector servo type disk drive as described above, the settle mode could use alternate sector servo signals. Extending the time between samples is an effective way to limit current since the current is a squared function of the time between sample instants. Doubling the sample time reduces by four the magnitude of the current pulses. However, this is not a desirable way to influence the mode of control since the objective is reduction of settle time to enhance overall performance.

The deadbeat control can be influenced by the mechanical design of the device in the first instance. The initial conditions when entering the control mode, including the transition conditions from the prior seek mode can be tailored to obtain more favorable conditions during the deadbeat controlled settle mode. Finally, the sampling period can be extended to reduce maximum deadbeat control current levels.

If the power supply is capable of supplying the required current and the linear operating range tolerates a two track deadbeat control capability, the deadbeat control can be used for single track seeks. This would cause a single track seek to take the form of a one track pitch error in the deadbeat control mode.

Although the invention has been described in the environment of a rotary actuator for a disk file, the same principles and technique would be applicable to a linear actuator which is DC motor driven or to other DC motor driven devices or systems that move quickly from one position to another position at which the device must be settled.

What is claimed is:

1. A rotating data storage device having transducer means mounted on an actuator for movement from track to track comprising
    motor means connected to said actuator for effecting track to track movement of said transducer means; and
    servo control means for causing said motor means to position said actuator, said servo control means including seek control means for moving said transducer means from an initial position to a position within a predetermined distance of the target track centerline and settle mode control means for controlling transducer positioning from said predetermined distance to alignment with said target track centerline,
    said settle mode control means comprising a deadbeat control sequence of a predetermined number of servo data samples to position said transducer means at said target track with no steady-state error and no ripple between settle mode servo samples.

2. The rotating data storage device of claim 1 wherein said servo control means comprises a delay compensated velocity estimator and a delay compensated controller.

3. The rotating data storage device of claim 2 wherein said settle mode deadbeat control includes said estimator with a characteristic polynomial wherein $De(z) = z^m$; said controller has a characteristic polynomial wherein $Dc(z) = z^p$; and said predetermined number of data samples do not exceed $m+p$,
    whereby the poles associated with said polynomials are located at the origin and the said number of servo data samples do not exceed the sum of the orders of the controller and estimator characteristic polynomials.

4. A servo control for moving a device from one location to another location comprising
    motor means connected to said device for moving said device from one location to another location and
    servo control means for causing said motor means to move said device from one location to another target location, said servo means having a plurality of modes of operation including seek mode means for moving said device to a position approaching the target location and a settle mode means for bringing said device to said target location, said settle mode means comprising a deadbeat control sequence of a predetermined number of servo data samples to position said device at said target location with no steady-state error, with no ripple between settle mode servo samples and with the servo system functioning in the linear region.

5. The servo control of claim 4 wherein said servo control means comprises a microprocessor including a velocity estimator and a controller with at least one of said estimator and said controller having a characteristic polynomial with the poles located at the origin.

6. The servo control of claim 4 wherein said servo control means comprises a microprocessor including a velocity estimator and a controller with the characteristic polynomials of both said estimator and said controller having the poles located at the origin and
said predetermined number of data samples do not exceed the sum of the orders of the characteristic polynomials of said estimator and said controller.

7. A servo system for a magnetic disk file in which an electrically driven voice coil motor (VCM) actuator moves a transducer head to different concentric recording tracks on a disk file, said disk file having recorded thereon a servo pattern which produces a position error signal (PES) which is a measure of the displacement of said transducer head from the centerline of one of said concentric tracks comprising
demodulator means that converts said servo signals to said position error signals; and
a microprocessor including an estimator and a controller,
at least one of said controller and said estimator having a characteristic polynomial with all poles associated with such polynomial located at the origin.

8. The magnetic disk file servo system of claim 7 wherein both said estimator and said controller have characteristic polynomials with the poles located at the origin and with deadbeat control of said microprocessor; whereby in the settle mode, the actuator system is settled during a sequence of sample times that does not exceed the sum of the orders of said estimator and controller characteristic polynomials and said settle mode is followed by a non-deadbeat track follow mode.

* * * * *